Feb. 27, 1934.   A. F. SAWYER   1,948,681
COMBINED REFRIGERATOR AND ICE CREAM FREEZER
Filed Feb. 13, 1931
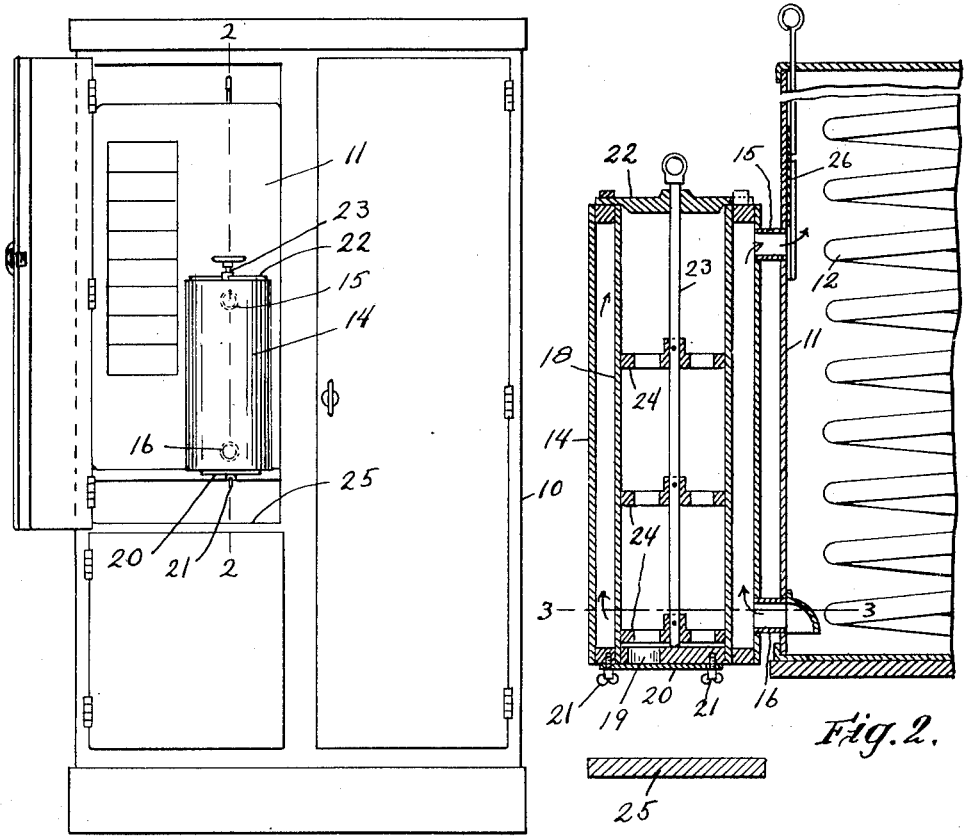
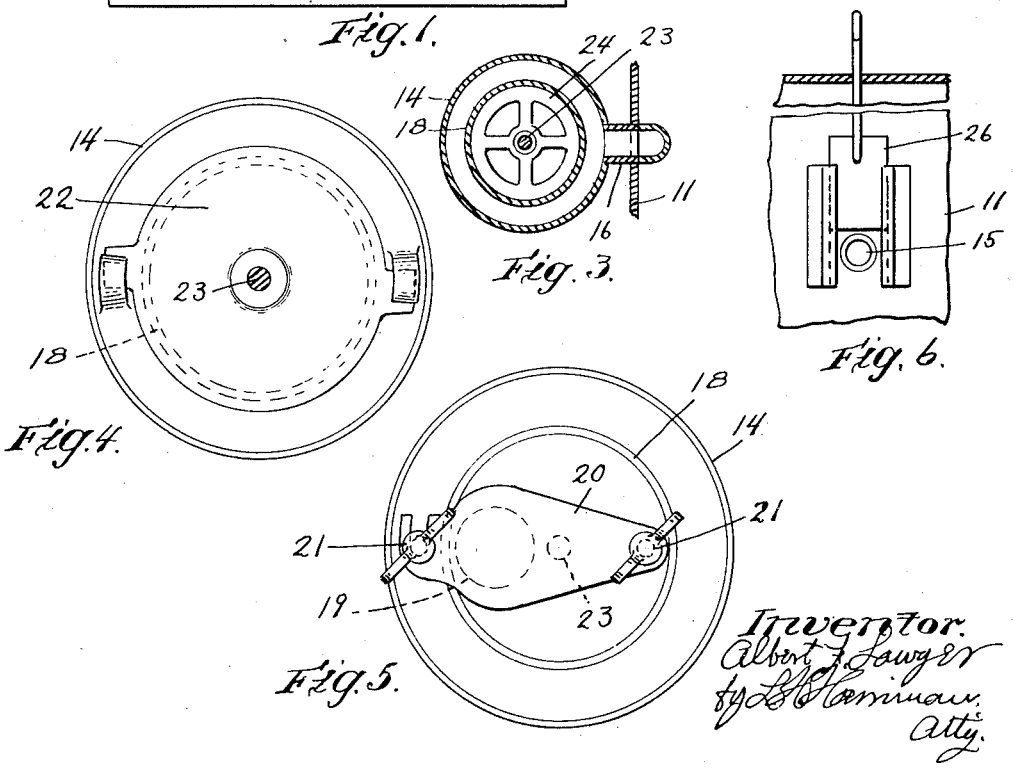

UNITED STATES PATENT OFFICE 1,948,681

COMBINED REFRIGERATOR AND ICE CREAM FREEZER

Albert F. Sawyer, Haverhill, Mass., assignor to Irving L. Keith, Haverhill, Mass.

Application February 13, 1931. Serial No. 515,474

2 Claims. (Cl. 62—101)

This invention relates to certain improvements in the construction disclosed by my prior Patent No. 1,767,357, dated June 24, 1930, in which an ice cream freezer is combined with the cooling tank of a refrigerator of the domestic type.

While the arrangement shown in said patent is advantageous in certain respects, it is disadvantageous in others, particularly on account of the fact that it is practically necessary to arrange the ice cream container horizontally, and unless the cream which is placed therein is frozen to a solid state, it is difficult to remove it from the container.

In the production of ice cream, however, it is usually considered that if the cream is frozen to a semi-liquid state while being churned, and then is placed in a freezing compartment to complete the solidifying process, satisfactory results will be secured.

The objects of my present invention are to provide a construction of the general character disclosed in my said prior patent, which is so arranged that the cream may be placed in the container conveniently and may then be quickly frozen to a semi-liquid state while being churned in a manner to prevent uneven freezing and the formation of undesirably large crystals, and then to permit ready removal of the cream while in the semi-liquid state, so that it may then be placed in a freezing compartment to finish the operation, the construction being such that the container in which the first operation is performed may be readily and thoroughly cleaned.

I accomplish these objects by means of the construction hereinafter described and as illustrated in the accompanying drawing, in which:

Fig. 1 is a front elevation of a common type of domestic refrigerator provided with a preferred embodiment of my invention.

Fig. 2 is a sectional view on an enlarged scale at the line 2—2 of Fig. 1.

Fig. 3 is a sectional view at line 3—3 of Fig. 2.

Figs. 4 and 5 are detail views of the top and bottom closures, respectively, which are employed and Fig. 6 is a detail view of a shut off valve which is employed.

In the drawing a common type of domestic refrigerator 10 is shown, in one side of which, near the top, a tank 11 is mounted containing a non-freezing liquid and an expansion coil 12.

According to my invention, an auxiliary refrigerating chamber 14 is mounted on the front side of the tank 11, in as close proximity thereto as practical, said chamber being in the form of a somewhat elongated cylinder and being supported in a vertical position and interiorly connected, near both its upper and lower ends, to the tank 11 by short pipes 15 and 16, so that it is normally in open communication therewith. As the cooling liquid in the tank will have a substantially lower temperature in its lower portion than in its upper portion it will circulate therefrom thru the lower connection 16, up thru the auxiliary chamber and back thru the upper connection 15 into the tank, so that the cooling liquid in the auxiliary chamber will be automatically maintained at approximately the temperature of the liquid in the tank. A cylindrical container 18 is mounted within the auxiliary chamber in a vertical position and in concentric relation therewith, so that the container will be completely surrounded at its sides by the cooling liquid, said chamber being arranged to open both at its top and bottom to the exterior of the chamber and having a liquid tight connection at its lower end to the bottom thereof. The bottom of said container is provided with a passage 19, which is normally closed by a closure plate 20, the latter being secured to the under side thereof by wing nuts 21, so that the closure plate may be swung to one side to open the passage 19. Said container is also provided with a top closure 22 having a central opening in which a dasher rod 23 is reciprocally mounted, said rod having one or more perforated dasher heads 24 thereon by means of which the contents of the container may be agitated, the particular form of agitating means shown being merely illustrative. The chamber 14 and the container 18 therein are so located that the dasher may be reciprocated to the extent necessary to agitate the contents of the container and to permit insertion and removal thereof. Also sufficient space is provided directly beneath the container to permit a receptacle to be placed beneath it on a suitable support, as 25.

In practice the liquid in the space about the container will be maintained at approximately the temperature of the liquid in the main tank, so that, to freeze a quantity of cream, the top closure will be removed, and the cream will be poured into the container and then the dasher and closure will be placed in position and the dasher will be moved up and down, so that the contents will be stirred and prevented from freezing to the walls of the container and the heat of the cream will be transferred to the surrounding cooling liquid. When the cream has been frozen to a semi-liquid state, the dasher will be removed and the contents of the container will be permitted to flow into another receptacle thru the bottom opening 19, a tray being usually employed for this purpose which may be placed in another compartment in the tank, so that the freezing operation may be completed.

A valve, as 26, will preferably be provided for closing one of the passages from the tank to the auxiliary chamber to prevent the circulation thru the latter when it is desired to wash out the container, a matter which, with the construction shown may be readily accomplished.

I claim:

1. In combination with a refrigerating tank having a low point freezing liquid therein, and means for maintaining the temperature thereof at a required low point, an auxiliary chamber having its sides extending vertically between the top and bottom of said tank and arranged in open communication at its upper and its lower ends with the interior of said tank at corresponding levels, to permit the liquid therein to be thermally circulated from the tank into said chamber at its lower end, upward in said chamber and outward therefrom at its upper end back into the tank, thereby to effect a heat exchange between the liquid in said chamber and that in the tank, and a container vertically disposed within said chamber and completely surrounded at its sides by the liquid therein, the top of said container opening to the exterior of said tank and chamber and having a suitable closure.

2. In combination with a refrigerating tank having a low point freezing liquid therein, and means for maintaining the temperature thereof at a required low point, an auxiliary chamber disposed in proximity to a side of said tank and extending vertically between the top and bottom thereof, horizontally extending passages providing open communication between the upper and the lower ends respectively, of said chamber and the interior of said tank at corresponding levels, to permit the liquid therein to be thermally circulated from the tank up through the chamber and back into the tank, to effect a heat exchange between the liquid in said chamber and that in the tank, and a container vertically disposed within said chamber and completely surrounded at its sides by the liquid therein, the top of said container opening to the exterior of said chamber having a suitable closure.

ALBERT F. SAWYER.